United States Patent [19]
Satoh et al.

[11] Patent Number: 4,864,440
[45] Date of Patent: Sep. 5, 1989

[54] MAGNETIC RECORDING AND REPRODUCING APPARATUS

[75] Inventors: Tomiyoshi Satoh; Masahiro Kimura; Hidenobu Takahashi, all of Hitachi, Japan

[73] Assignee: Hitachi, Ltd., Tokyo, Japan

[21] Appl. No.: 188,627

[22] Filed: May 2, 1988

Related U.S. Application Data

[63] Continuation of Ser. No. 769,319, Aug. 26, 1985, abandoned.

[30] Foreign Application Priority Data

Sep. 5, 1984 [JP] Japan .................................. 59-184651

[51] Int. Cl.⁴ ............................................. G11B 5/016
[52] U.S. Cl. .............................. 360/99.02; 360/99.06
[58] Field of Search ................... 360/97, 99, 135, 133, 360/96.5, 105, 99.02, 99.01, 99.06

[56] References Cited

U.S. PATENT DOCUMENTS

| | | | |
|---|---|---|---|
| 4,546,397 | 10/1985 | Asami et al. | 360/99 |
| 4,587,585 | 5/1986 | Shimaoka et al. | 360/133 X |
| 4,604,666 | 8/1986 | Kitahara et al. | 360/97 X |
| 4,614,990 | 9/1986 | Saito | 360/99 X |
| 4,651,240 | 3/1987 | Okita et al. | 360/99 X |

FOREIGN PATENT DOCUMENTS

| | | | |
|---|---|---|---|
| 0082505 | 6/1983 | European Pat. Off. | 360/97 |
| 0157588 | 10/1985 | European Pat. Off. | 360/97 |

*Primary Examiner*—Robert S. Tupper
*Assistant Examiner*—Andrew L. Sniezek
*Attorney, Agent, or Firm*—Antonelli, Terry & Wands

[57] ABSTRACT

A magnetic recording and reproducing apparatus having the magnetic disc cassette with a built-in shutter, a shutter lever for opening and closing the shutter and lock lever for controlling a lowering and raising of a holder are installed on an upper surface of the holder. During the insertion of the magnetic disc cassette, the shutter lever releases the shutter, the lock lever is disengaged from a locking step of an eject lever, the shutter lever is lowered into the cassette and releases the shutter, and a magnetic head contacts the magnetic disc. During ejection of the cassette, a lock releasing step of the eject lever is pressed on a stop lever, the stop lever is rotated and is disengaged from the lock lever, an operation lever of the lock lever is disengaged from the shutter lever, and the cassette is disengaged and simultaneously the shutter is closed. During a protective operation, the shutter lever is pressed on the shutter, a shutter push member of the shutter lever is pressed on the holder and is stopped, a lock claw of the lock lever remains engaged with a lock releasing step of the eject lever, and the cassette and the holder are not lowered and the magnetic head does not collide with the shutter.

16 Claims, 8 Drawing Sheets

MAGNETIC RECORDING AND REPRODUCING APPARATUS

This application is a continuation of application Ser. No. 769,319, filed on Aug. 26, 1985 now abandoned.

BACKGROUND OF THE INVENTION

The present invention relates to a magnetic recording and reproducing apparatus, and particularly to a magnetic recording and reproducing apparatus employing cassette type of flexible disc.

In, for example, Japanese Utility Model Laid Open No. 58-26771, a conventional magnetic recording and reproducing apparatus is proposed which solely provides a protective apparatus for preventing the magnetic head by its collision with a magnetic surface of a magnetic disc cassette in case of ejecting the magnetic disc cassette having no shutter.

However, since this conventional magnetic recording and reproducing apparatus does not consider the connection between a magnetic disc cassette with a built-in shutter and a shutter open and close mechanism, it is necessary to separately provide respective mechanisms for the magnetic recording and reproducing apparatus.

An object of the present invention is to provide a magnetic recording and reproducing apparatus employing a magnetic disc cassette with a built-in shutter wherein the falling down and floating up of a holder can be obtained stably.

Another object of the present invention is to provide a magnetic recording and reproducing apparatus employing a magnetic disc cassette with a built-in shutter wherein a magnetic head by its collision with the shutter of the magnetic disc cassette can be prevented.

Further object of the present invention is to provide a magnetic recording and reproducing apparatus employing a magnetic disc cassette with a built-in shutter wherein loading errors during the falling down of the magnetic disc cassette can be eliminated.

Still another object of the present invention resides in providing a magnetic recording and reproducing apparatus employing a magnetic disc cassette with a built-in shutter wherein damage of the magnetic disc cassette during the floating up operation thereof can be prevented.

A still further object of the present invention resides in providing a magnetic recording and reproducing apparatus employing a magnetic disc cassette with a built-in shutter wherein snag by the ejection of the magnetic disc cassette during the floating up operation thereof can be prevented.

Yet another object of the present invention resides in providing a magnetic recording and reproducing apparatus employing a magnetic disc cassette with a shutter wherein damage and failure caused by erroneous use from itself can be prevented.

Another object of the present invention is a magnetic recording and reproducing apparatus employing a magnetic disc cassette with a built-in shutter wherein the opened or closed condition of the shutter of the magnetic disc cassette can be detected.

A further object of the present invention resides in providing a magnetic recording and reproducing apparatus employing a magnetic disc cassette with a built-in shutter wherein the magnetic disc cassette being pushed into the final end in the closed condition can be prevented.

Yet another object of the present invention is a magnetic recording and reproducing apparatus employing a magnetic disc cassette with a built-in shutter wherein a cassette controlling section can be made smaller.

In accordance with the present invention, a magnetic recording and reproducing apparatus is provided which includes a chassis, a carriage having a magnetic head mounted on the chassis, an eject lever mounted on the chassis, as well as a holder having a cassette chamber installed in the eject lever. A magnetic disc with a built-in shutter is installed on the cassette chamber of the holder, and a means are provided for opening and closing the shutter of the magnetic disc cassette. The means for opening and closing the shutter include a shutter lever and a shutter spring for biasing the shutter lever. An insertion or ejection of the magnetic disc cassette is carried out by a falling down or lowering and a floating up or raising of the holder.

In accordance with advantageous features of the present invention, the eject lever includes a locking step, the shutter open and close means is installed on an upper surface of the holder, and means for controlling the lowering or falling down and raising or floating up the holder are installed on the upper surface of the holder. The falling down and floating up control means includes a locking member and an operation lever. In an inserting operation of the magnetic disc cassette, the holder is positioned at an upper portion, and the shutter lever of the shutter open and close means rotates in opposition to a force of the shutter spring of the shutter open and close means so as to open the shutter of the magnetic disc cassette in accordance with an inserting force of the magnetic disc cassette. The locking member of the holder falling down and floating up control means engages with the locking step of the eject lever, and the operation of the holder falling down and floating up control means is disengaged from the shutter open and close means whereby the holder falling down and floating up control means is uneffected.

The present invention has a mutual complimentary construction including a mechanism for detecting a shutter open and closed state in a shutter opening and closing mechanism section, shifting the next step of the inserting of the magnetic disc cassette after confirming the opened or closed condition in the opening and closing shutter mechanism section, and accomplishing a cassette ejecting operation after confirming the completion of the floating up operation of the magnetic disc cassette.

According to the present invention, the magnetic recording and reproducing apparatus which can operate stably and prevent damage and failure caused by erroneous use from itself by means of connecting a shutter open and close mechanism with a cassette load and discharge control apparatus and simplifying them in employing the magnetic disc cassette with a built-in shutter.

Figure 13:
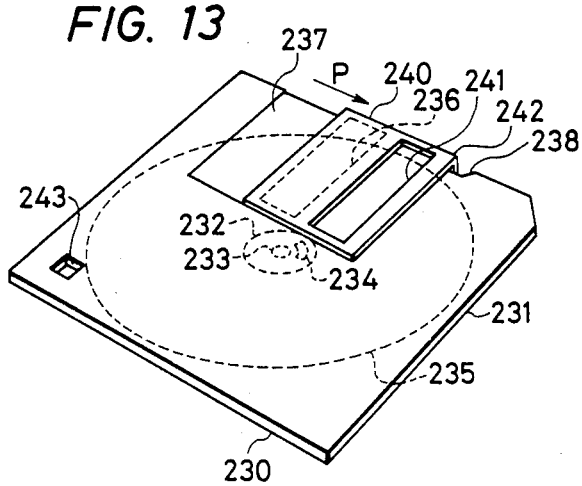
FIGS. 13 and 14 are external views showing a magnetic disc cassette.
Figure 14:
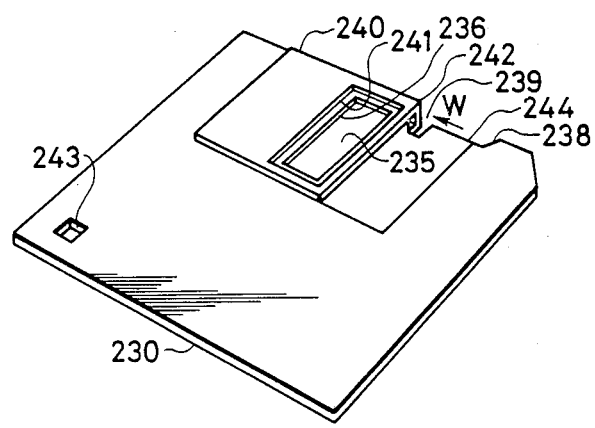
Figure 15:
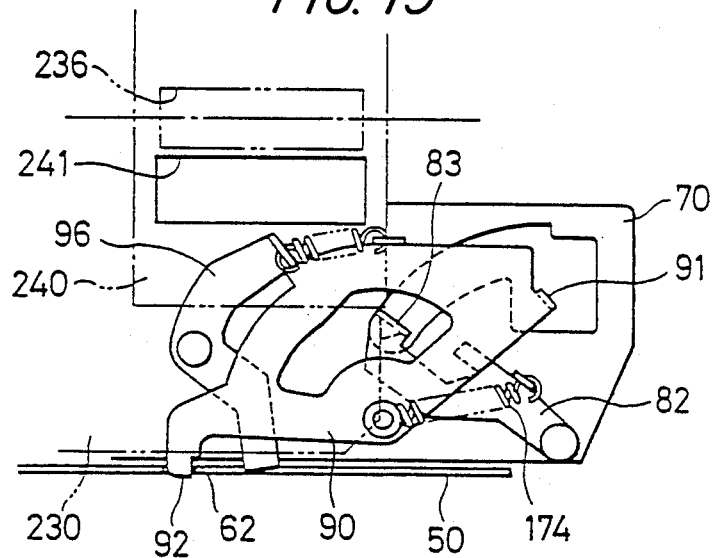
FIGS. 15 through 18 are view similar to FIG. 6 but further showing in greater detail the operation of the present invention during various stages of insertion of the magnetic disc cassette.
Figure 16:
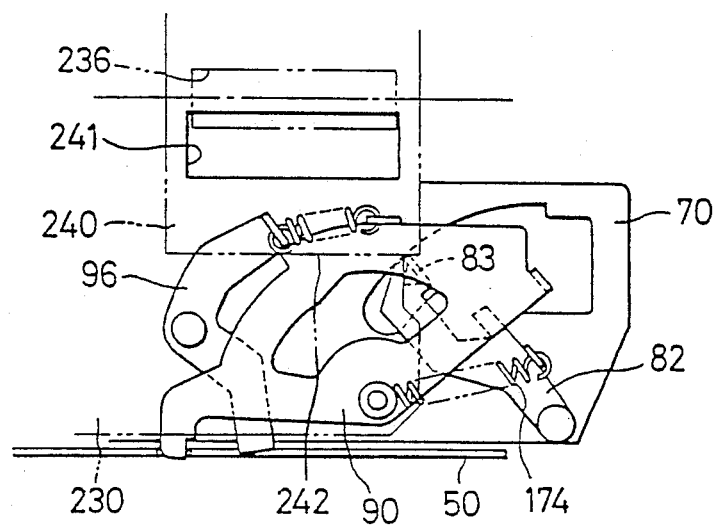
Figure 17:
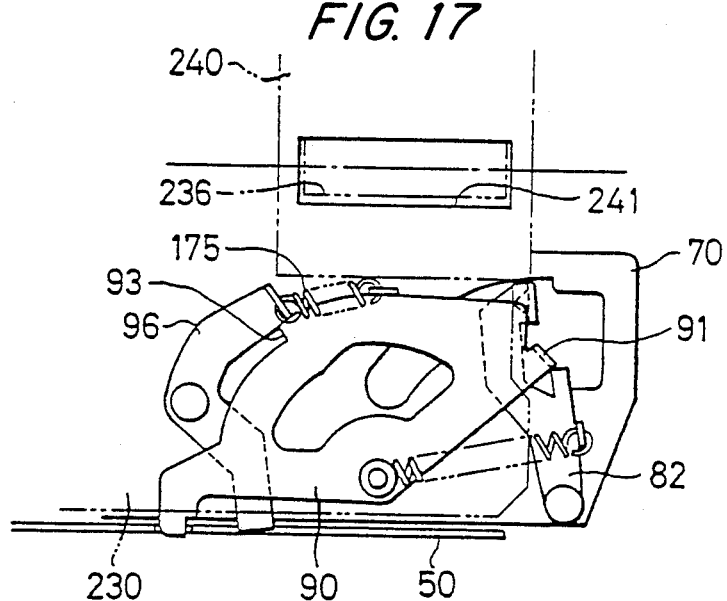
Figure 18:
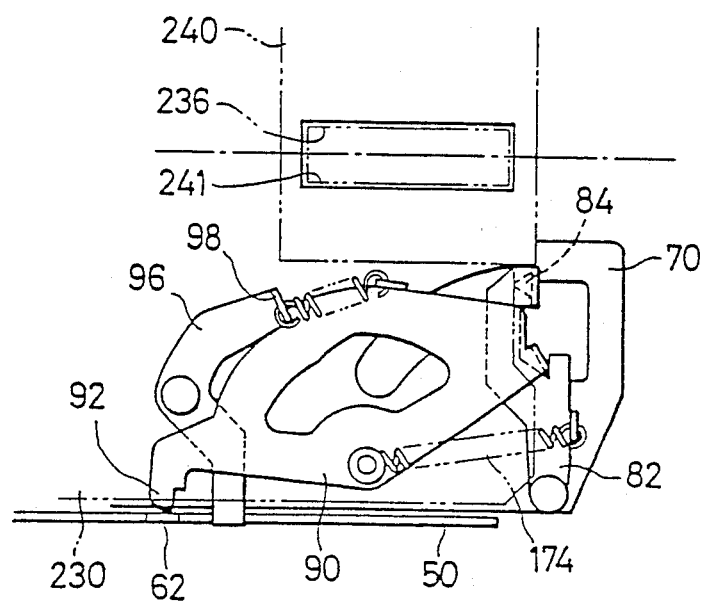

Referring now to the drawings wherein like reference numerals are used throughout the various views to designate like parts and, more particularly, to FIGS. 13 and 14, according to these figures, a magnetic disc cassette 230 includes a magnetic flexible disc 235 in the interior of a cassette case 231. A hub 232, including a shaft hole 233 and a driving pin hole 234, is mounted at the central part of the magnetic flexible disc 235. The magnetic flexible disc 235 is rotated by fitting a driving hub in the hub 232.

The magnetic disc cassette 230 provides a head window 236 as a window for head contact. A shutter 240 protects the head window 236 when the cassette is not in use, with the shutter 240 being mounted on a shutter-mounting step 237. A shutter 240 has a spring (not shown) within itself and is always forced in the direction of the arrow P as shown in FIG. 13. When the shutter 240 is not in use, the shutter 240 is always shifted rightwardly of the shutter mounting step 237.

Accordingly, a shutter window 241 provided in the shutter 240 occupies a different position from that of the head window 236 of the cassette case 231 and thus the head window 236 is closed normally.

In the magnetic disc cassette 230 having the above-stated construction a stronger force (W) than the force of the spring is imparted to a shutter end 242 from the opposite side to the direction of the arrow P as shown in FIG. 14, the shutter 240 slides toward the right of the figure.

As a result, the shutter window 241 coincides with the head window 236. Thus, the magnetic flexible disc 235 is changed into an open condition. Consequently, it is possible to record and reproduce the magnetic flexible disc 235 by contacting the magnetic flexible disc 235 with a magnetic head.

Herein, a shutter lever guide 238 denotes a guide for securely pressing a mechanism for opening or closing the shutter 240 on the shutter end 242. A stopper guide 239 denotes a notch for protecting the mechanism from erroneous operation. An opening section 243 denotes a write-protect opening to prevent the contents of the magnetic flexible disc 235 from being written over.

Figure 1:
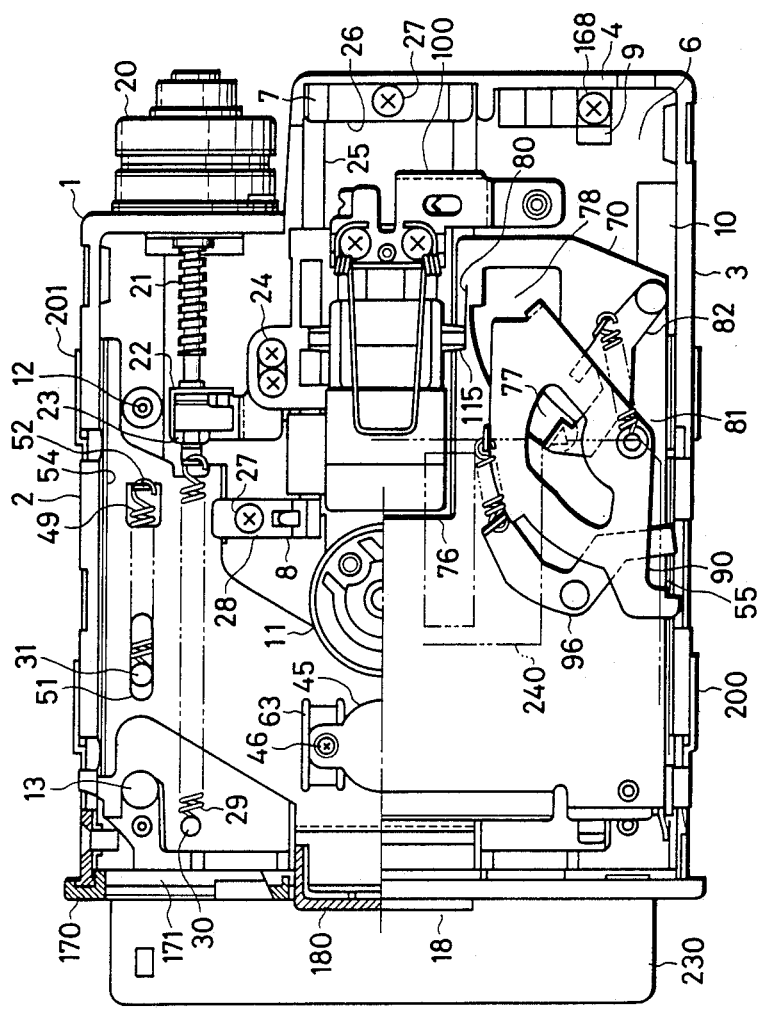
FIG. 1 is a partial sectional plan view of a magnetic recording and reproducing apparatus constructed in accordance with the present invention.

As shown in FIG. 1, the magnetic recording and reproducing apparatus for driving the magnetic disc cassette 230 includes a chassis 1 comprises a side wall 2 linked with a mount wall 5 of a stepping motor 20, a side wall 3 provided over the overall region opposite to the side wall 2, a rear wall 4 and a bottom portion 6. The chassis 1 is formed a box-like shape and has an opening only at an operating section side 18.

Two guide shafts 25 for slidably holding a carriage 100 are mounted on a counter-operating section side at the nearly central portion of the chassis 1. Respective guide shafts 25 provide a guide shaft mount seat 7 secured by a push plate 26 and a setscrew 27 and a guide shaft mount seat 8 secured by a push plate 28 and the setscrew 27.

Further, a sensor mount seat 9 is provided in the inside of the rear wall 4 for mounting a photosensor 138 including a photo-interrupter by a setscrew 168. An aperture 10 for wiring is provided at the bottom portion 6 of the chassis 1.

A lead screw 21 and a joint metal receiving seat 22 for the carriage 100 are provided respectively to the one side of the mount wall 5 of the stepping motor 20. A nut 23 is provided to the joint metal receiving seat 22 so as to stop a shaft. A spring 29 is mounted between the joint metal receiving seat 22 and a spring pin 30.

Figure 3:
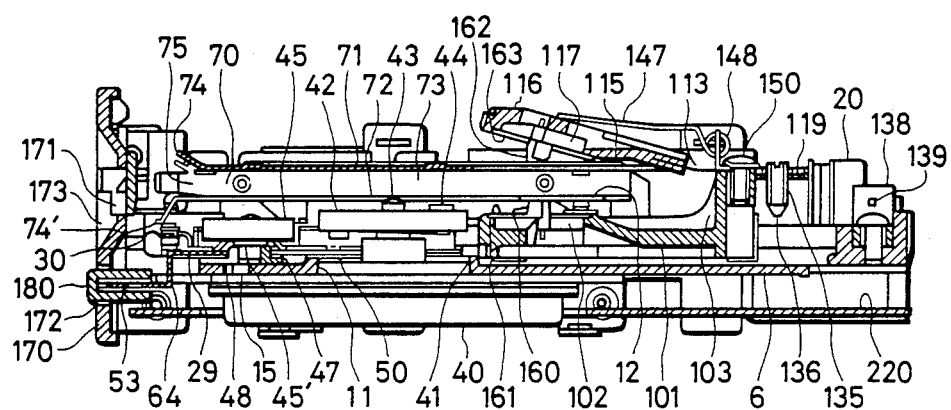
FIG. 3 is a sectional view showing the condition before inserting a magnetic disc cassette.
Figure 4:
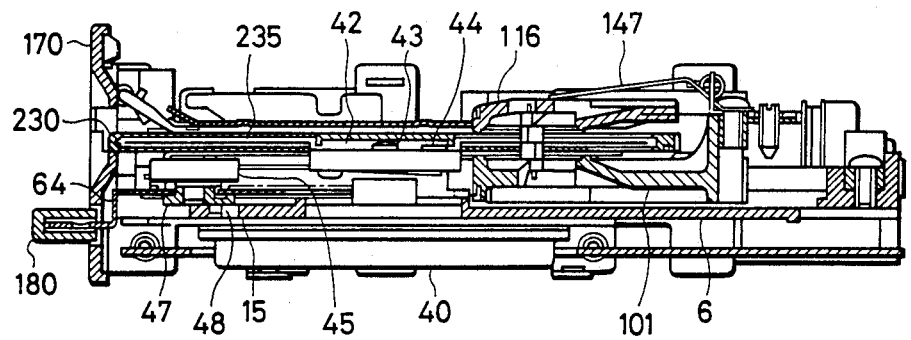
FIG. 4 is a sectional view showing the condition after loading a magnetic disc cassette.

As shown in FIGS. 3 and 4, the bottom portion 6 of the chassis 1 provides a mounting section 11 of a disc drive motor 40. A mounting step 41 of the disc drive motor 40 is fitted in the mounting section 11 and a hub shaft 43 of the disc drive motor 40 is pierced in the mounting section 11. The hub shaft 43 provides a hub receiver 42.

Figure 2:
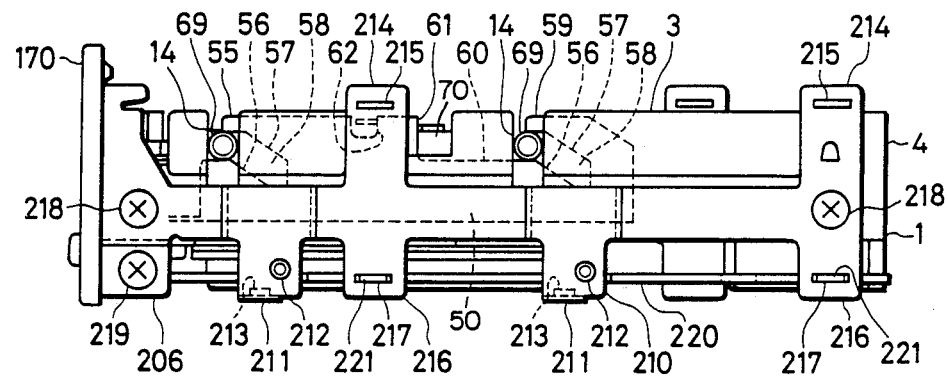
FIG. 2 is a side view of a magnetic recording and reproducing apparatus according to the present invention.

Moreover, as shown in FIG. 1, receiving seats 12 and 13 of the magnetic disc cassette 230 are provided on the inside of the bottom portion 6 of the chassis 1. A cam groove 15 is provided at the side of the operating section side 18 on the bottom portion 6 in the condition that it is pierced therein. As shown in FIG. 2, the side walls 2 and 3 of the chassis 1 respectively provide roller grooves 14.

As shown in FIG. 3, there is provided in the interior of the chassis 1 a button-mounting tongue portion 53 sliding on the bottom portion 6 and formed through a L-curve portion 64 at the side of the operating section side 18. The button-mounting tongue portion 53 mounts an eject button 180. There is provided on both sides of the chassis 1 an eject lever 50 including a side plate 54 nearly contacting the side wall 2 and a side plate 55 nearly contacting the side wall 3.

A cam-mounting section 63 is provided at the portion of the eject lever 50 in opposition to the cam groove 15 of the chassis 1. An oil damper 45 is secured on the cam-mounting section 63 by a damper screw 46. A damper shaft 45' projecting from the bottom of the oil damper 45 is provided with a damper cam 47, and a cam shaft 48 of the damper cam 47 is slidably fitted in the cam groove 15 of the chassis 1.

As shown in FIG. 1, a relief hole 51 is provided on the bottom of the eject lever 50 for a spring pin 31 projecting from the bottom portion 6 of the chassis 1. An eject spring 49 is mounted between the spring pin 31 and a spring fixture 52 of the eject lever 50. The eject lever 50 is always forced in the operation section side 18 by the eject spring 49.

Further, as shown in FIG. 2, the side plate section 54 and the side plate section 55 of the eject lever 50 provide a slanted groove 58 comprising of an upper slanted guide 57 and a lower slanted guide 56 at the location in opposition to the roller grooves 14 provided on the side walls 2 and 3 of the chassis 1. The lower slanted guide 56 is connected to a roller seat 60 on a horizontal section and the upper slanted guide 57 is connected to a roller receiver 59. A lock releasing step 61 formed of a rising part is formed on the extension portion of the roller seat 60 of the eject lever 50 and in advance of the lock releasing step 61, a locking step 62 is provided on the eject lever 50.

As shown in FIG. 3, a holder 70 is installed in the inside of the side plate sections 54 and 55 of the eject lever 50. The holder 70 provides a C-like cassette chamber 75 comprising of an upper surface plate 71, a lower surface plate 72 and a side plate 73.

An inlet side of the cassette chamber 75 of the holder 70 provides a cassette guide 74 made by forming part of the upper surface plate 71 toward the opening and a cassette guide 74' made by forming part of the upper surface plate 72 toward the opening. The side plate 73 of the holder 70 provides the roller groove 14 provided on the side wall of the chassis 1 and a guide roller 69 loosely inserted in the slanted groove 58 of the eject lever 50 provided in opposition to the roller grooves 14.

Further, as shown in FIG. 1, the upper surface of the holder 70 provides a head opening 76 for a magnetic head 162 for recording and reproducing and the outer circumference of the head opening 76 is constructed to be a head rail 80. In addition, a cassette control section 81 is installed to the upper surface of the holder 70.

Figure 5:
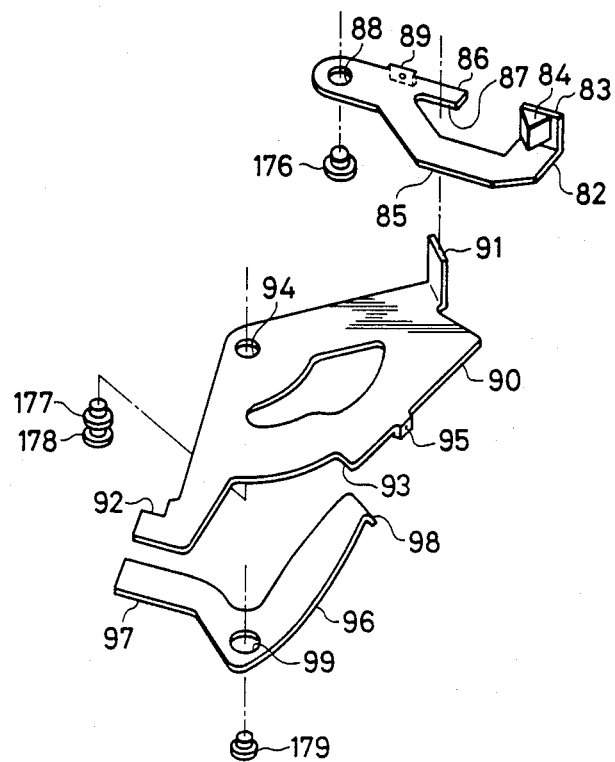
FIG. 5 is an exploded perspective view of a magnetic disc cassette control section.
Figure 6:
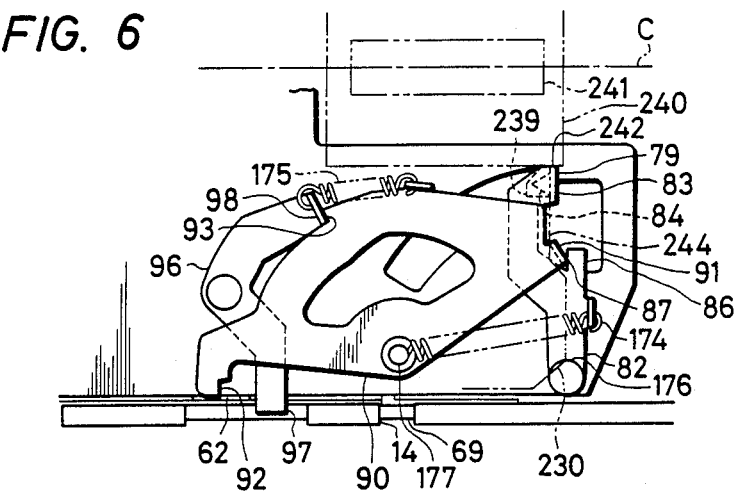
FIG. 6 is a detail view showing the operation when a magnetic disc cassette is not installed or is not inserted.

As shown in FIG. 5, the cassette control section 81 includes a shutter lever 82, a lock lever 90, a stop lever 96 and the like. The shutter lever 82 comprises a shutter push section 83 for opening and closing the shutter 240 of the magnetic disc cassette 230, a guide stopper 84 for detecting erroneous operation, a C-shaped portion 85, a projecting portion 86, a lock lever stopper 87, and a spring fixture 89.

The shutter lever 82 is rotatively installed on the upper surface plate 71 of the holder 70 by fitting a shutter lever shaft 176 in a rotation shaft hole 94. The shutter push section 83 and the guide stopper 84 of the shutter lever 82 project from a shutter lever opening 77 to the cassette chamber 75.

As shown in FIG. 5, the lock lever 90 comprises an operation lever 91, a lock claw 92, a return stopper 93, and a spring fixture 95. The lock lever 90 is rotatively installed so as to slidably move the shutter lever 82 between the upper surface plate 71 of the holder 70 and the shutter lever 82 itself by fitting a lock lever shaft 177 in the rotation shaft hole 94. The operation lever 91 pierces the lock lever opening 78 of the upper surface plate 71 of the holder 70 into the cassette chamber 75.

The stop lever 96 comprises an operation arm 97, and a stopper section 98 having a function of a spring fixture, as shown in FIG. 5. Similarly with the shutter lever 82, the stop lever 96 is rotatively attached so as to be loosely movable between the upper surface plate 71 of the holder 70 and the lock lever 90 by fitting a stop lever shaft 179 in a rotation shaft hole 99.

A shutter spring 174 and a lock spring 175 are respectively attached between respective levers thereof, that is, between the spring fixture 89 of the shutter lever 82 and a spring fixture 178 integrally formed with the lock lever shaft 177 and between the spring fixture 95 of the lock lever 90 and the spring fixture 98 of the stop lever 96.

When the magnetic disc cassette 230 is not installed or not inserted, the shutter lever 82 and the lock lever 90 are forced in the counter-clockwise direction, respectively, and the stop lever 96 is forced in the clockwise direction.

Thus, the lock claw 92 of the lock lever 90 is pressed on the locking step 62 of the eject lever 50 and thus the eject lever 50 is prevented from moving into the operating section side 18.

At this time, the operation arm 97 of the stop lever 96 is constructed not to be pressed upon the lock releasing step 61 of the eject lever 50. Further, a lever stopper 79 of the shutter lever 82 is provided at the termination of the shutter lever opening 78 of the upper surface plate 71 of the holder 70.

In the above cassette control section 81, a means for opening and closing the shutter 240 of the magnetic disc cassette 230 comprises the shutter lever 82 and the shutter spring 174. A means for controlling falling down and floating up for the holder 70 is comprised of the lock lever 90.

The shutter open and close means of the magnetic disc cassette 230 and the section for falling down controlling and floating up controlling the holder 70 is installed on an upper surface of the holder 70 respectively.

The shutter open and close means controls operation of the holder falling down and floating up control means in inserting magnetic disc cassette 230. The section for falling down controlling and floating up controlling the holder 70 controls operation of the shutter open and close means in ejecting the magnetic disc cassette 230.

The lock lever 90 is provided to be rotated by the push of the magnetic disc cassette end face to the lock lever 90 as the section for falling down controlling and floating up controlling the holder 70 and the action of rotation serves to release a fall-stopping section.

The stop lever 96 is provided to be engaged with the lock lever 90 when the fall-stopping section is released and to stop a returning force of the lock lever 90. The engagement of the stop lever 96 with the lock lever 90 is released by the pushing the eject lever 50.

The shutter lever 82 provides the guide stopper 84 and the holder 70 provides a lever stopper for the shutter lever 82.

The shutter lever 82, the lock lever 90, and the stop lever 92 are plate members and are made in a stacked structure.

Figure 9:
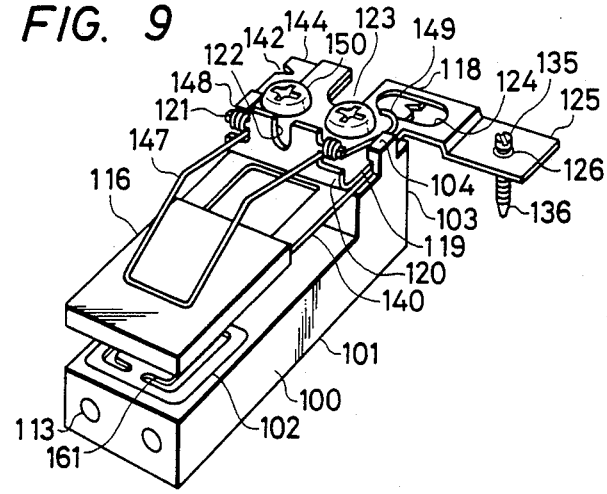
FIG. 9 is a perspective view of a carriage.
Figure 10:
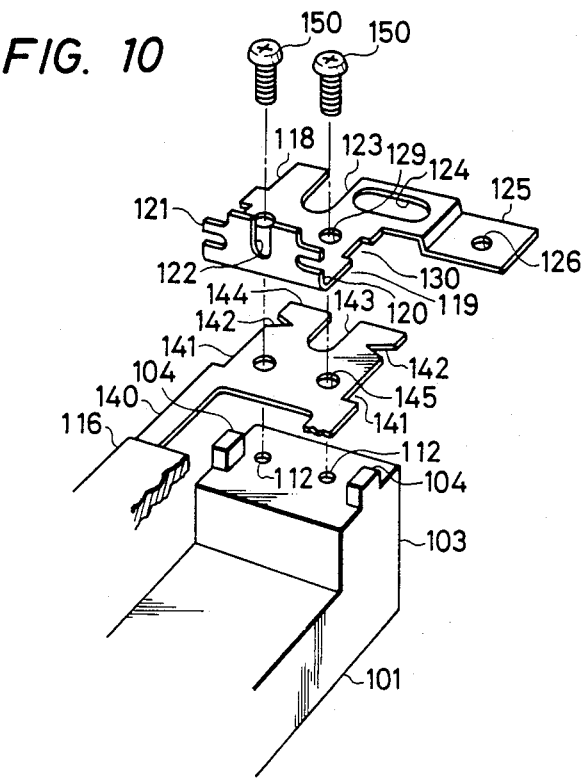
FIG. 10 is an exploded perspective view showing a carriage section.

The carriage 100, in which the magnetic head 162 is loaded, as shown in FIGS. 9 and 10, mainly comprises of a carriage body 101 where a lower head 160 is loaded and a head arm 116 where an upper head 162 is loaded.

The carriage body 101 of the carriage 100 includes a through-out sliding hole 113 of the guide shaft 25 on the bottom and a low head fixing section 102 on the front. The lower head 160 is mounted at the lower head fixing section 102 through a lower head gimbal spring 161. A rising portion 103 is formed at the reverse side to the lower head fixing section 102 and a plurality of projections 104 are formed on the upper end face of the rising portion 103 of the carriage 100.

The upper end face of the carriage rising portion 103 includes an upper head fixing section 117. The upper head fixing section 117 provides a head arm spring 140 integrally provided with the head arm 116 attaching the upper head 162 through an upper head gimbal spring 163. The head arm spring 140 is fixed at a fixed tapped hole 112 of the carriage body 101 by a fixing screw 150 through a spring push part 119 of a spring push plate 118. The head arm 116 is pressed upon the head rail 80 at a supporting point 115.

The head arm spring 140 includes an escape portion 141 of the projection 104 of the carriage body 101. The escape portion 141 of the head arm spring 140 forms a V-groove 142 on its extension portion 144 and forms a passage 143 of the head code on the central portion of its end. A passage 145 of the fixing screw 150 is also provided.

The spring push plate 118 provides a fixed tapped hole 129 on the tabular spring push part 119 and a guide cutaway portion 130 in opposition to the projection 104 of the carriage body 101. The guide cutaway portion 130 is constructed to be fitted with the projection 104 with nearly no space.

A L-form rising portion 120 is provided at a forward portion of the spring push section 119 and the L-form rising portion 120 forms a push spring supporting part 121. A coil section 148 of a head-push spring 147 is attached to the supporting part 121 and the seat section 149 is pressed upon the upper surface of the spring push part 119.

The other end of the head push spring 147 is pressed upon the upper surface of the head arm 116 so as to always apply suitable weight on the lower head 160 and upper head 162. A vent hole 122 of the head code is provided.

The other end of the spring push plate 118 integrally provides a sensor base section 125 forming a head code vent hole 123 and including an opening 124 in which the V-groove 142 of the head arm spring 140 is observed.

A tapped hole 126 is formed in the sensor base section 125 and there is fitted in the tapped hole 126 a sensor screw 135 having a taper portion 136 as shown in FIG. 9. The taper portion of the sensor screw 135 is designed to screen a sensor optical axis 139 of the photosensor 138 attached with the chassis 1.

As shown in FIG. 3, the front panel 170 includes a cassette insertion inlet 171 to form the front side of the cassette insertion inlet 171 as a slanted opening portion 173 and to easily load and eject the magnetic disc cassette 230.

Further, the front panel 170 includes a vent hole 172 of the eject button 180 pressed into the button-mounting tongue section 53 of the eject lever 50. The front panel 170 is attached to mounting plates 200 and 201 by a panel fixing screw 219. (Confer FIG. 2).

Moreover, the mounting plates 200 and 201 are respectively mounted in the outside of the side wall 2 and the side wall 3 of the chassis 1.

Figure 11:
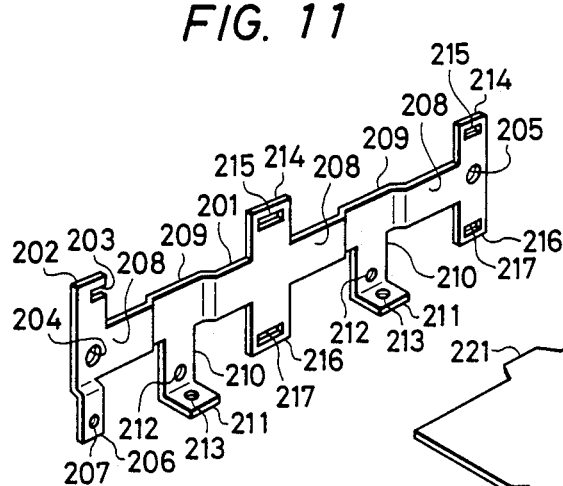
FIG. 11 is a perspective view of a mounting plate.

As shown in FIGS. 2 and 11, the press surface 208 pressed on the side wall of the chassis 1 by a screw 218 includes an escape curve portion 209 which is not pressed upon the side wall of the chassis 1 at the suitable place of the press surface 208 and which forms a mounting arm 210 extending from the escape curve portion 209 to the downward direction.

The rising part of the mounting arm 210 provides a fixing tapped hole 212 for mounting the magnetic recording and reproducing apparatus on an instrument from the side, and the L-form mounting seat 211 provided at the low end of the rising part similarly provides a fixing tapped hole 213 for mounting the magnetic recording and reproducing apparatus on an instrument from the bottom side.

The press surface 208 provides fixing holes 204 and 205 for fixing itself to the side wall of the chassis 1 and forms a front panel seat 206 at the front end lower portion of the press surface 208. The front panel 170 is mounted on a front panel fixing tapped hole 207 provided at the front panel seat 206.

Further, a U-groove 203 is provided at an upper extension portion 202 of the press surface 208 and besides a plurality of upper supporting arms 214 are provided in the extension portion 202 and at once an upper side supporting groove 215 is formed at the upper supporting arm 214. Similarly, the lower supporting arms 216 are formed at a lower extension portion of the press surface 208 and the lower side supporting groove 217 is formed at the lower arm 216.

Figure 12:
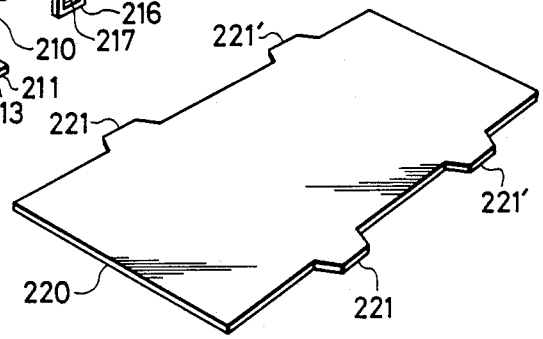
FIG. 12 is a perspective view of a print substrate.

A print substrate 220 for installing a control circuit for controlling the recording and the reproducing thereon, as shown in FIG. 12, includes supporting projections 221 and 221'. When mounting the print substrate 220 on the upper side, the projection 221 is mounted and fixed at the upper side supporting groove 215. In case of mounting the print substrate 220 on the lower side, the projection 221 is mounted and fixed at the lower side supporting groove 217.

Next, the operation of the magnetic recording and reproducing apparatus in the present invention will be described.

Before loading the magnetic disc cassette 230, that is, in the unused condition, the eject lever 50 is located where it is pushed. The guide roller 69 mounted on the holder 70 is located on the roller seat 60 of the eject lever 50. As a result, the holder 70 is stopped at the upper position.

Accordingly, in this condition, the head rail section 80 of the holder 70 is pressed upon the supporting point 115 of the head arm 116. Thus, the head arm 116 is lifted up by the flexing of the head arm 140 as shown in FIG. 3. Consequently the upper head 162 is maintained at higher position than the upper surface plate 71 of the holder 70.

Further, at this time, the cassette control section 81 mounted on the holder 70 is as shown in FIG. 1. Namely, the shutter lever 82 is located in the left side of the shutter lever opening 77 by the shutter spring 174.

The lock lever 90 is forced in the counter-clockwise direction by the lock spring 175, and the lock claw 92 is pressed upon the locking step 62 of the eject lever 50. Consequently, the left-direction force of the eject lever 50 caused by the eject spring 49 is supported at the locking step 62 of the eject lever 50 and thus the eject lever 50 is stopped at this position.

At this time, as to the stop lever 96, the stopper section 98 of the stop lever 96 is run on to the upper edge of the return stopper 93 of the lock lever 90, as shown in FIG. 1. As shown in the solid lines in FIG. 7, the operation arm 97 of the stop lever 96 is separated from the lock releasing step 61.

Next, the inserting operation the magnetic disc cassette 230 is described.

The magnetic disc cassette 230 will be inserted into the cassette insertion opening 171 of the front panel 170. When the magnetic disc cassette 230 is inserted into the location shown in a one-dot chain line of FIG. 1, the shutter push section 83 of the shutter lever 82 is moved along the shutter lever guide 238 of the magnetic disc cassette 230. Consequently, the shutter push section 83 is pressed upon the shutter end 242 of the shutter 240 on the magnetic disc cassette 230.

Moreover, continuing the insertion of the magnetic disc cassette 230, the shutter lever 82 is rotated in the clockwise direction as opposing the shutter spring 174 by means of the inserting force. Thus, the shutter 240 of the magnetic disc cassette 230 is moved gradually in a left direction by virtue of the shutter push section 83.

Furthermore, continuing the insertion of the magnetic disc cassette 230, the cassette end 244 is pressed upon the operation lever 91 of the lock lever 90 and the force is applied to the operation lever 91 by the insertion of the magnetic disc cassette 230. Consequently, the lock lever 90 begins to rotate in the clockwise direction as opposing the force of the lock spring 175.

Advancing the insertion of the magnetic disc cassette 230, the operation lever 91 is advanced to the space defined by a projecting portion 86 and the C-form part 85 formed in the shutter lever 82. Concurrently, the rotation of the lock lever 90 serves to move the return stopper 93 in the clockwise direction.

Shortly after this, the return stopper 93 of the lock lever 90 coincides with the stopper 98 of the stop lever 96. The clockwise rotational force applied to the stop lever 96 by the lock spring 175 serves to engage the stopper 98 of the stop lever 96 with the return stopper 93.

The lock claw 92, formed in the lock lever 90, is rotated in the clockwise direction. Thus, the lock claw 92 of the lock lever 90 is disengaged from the locking step 62 of the eject lever 50, when the guide stopper 84 of the shutter lever 82 falls down into the stopper guide 239 of the magnetic disc cassette 230 and concurrently, the release of the shutter 240 of the magnetic disc cassette 230 is completed.

As a result, the head window 236 of the magnetic disc cassette 230 coincides with the shutter window 241 thereof so that the magnetic surface of the magnetic flexible disc 235 is released at the head window 236.

Figure 7:
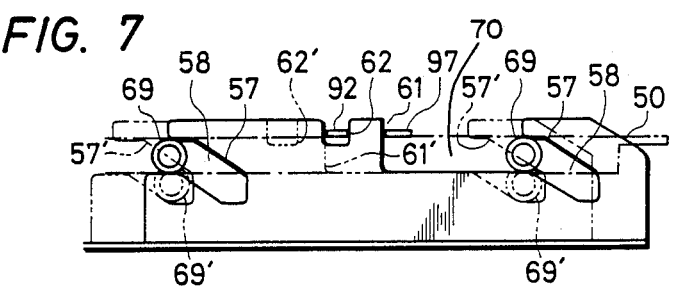
FIG. 7 is a detailed view showing the operation when a magnetic disc cassette is installed or is inserted.

As soon as the lock claw 92 of the lock lever 90 is disengaged from the locking step 62 of the eject lever 50 is moved in the left direction by virtue of the eject spring 49 as shown in a one-dot chain line of FIG. 7 and the eject button 180 is projected forward.

The guide roller 69, mounted to the holder 70, is moved downward along the slanted groove 58 of the eject lever 50 as guided by the roller groove 14 of the chassis 1. The magnetic disc cassette 230 in the holder 70 is concurrently moved downward.

Shortly after this, the bottom surface of the cassette case 231 of the magnetic disc cassette 230 is placed on the cassette seats 12 and 13 of the chassis 1. Concurrently, the hub 232 of the magnetic flexible disc 235 is pressed upon the hub seat drive surface 42 of the disc drive motor 40 and the hub shaft 43 and the driving pin 44 are respectively fitted in the shaft hole 233 and the driving pin hole 234 so as to bring about the condition capable of driving the magnetic flexible disc 235.

Concurrently with the downward movement of the holder 70, the head rail 80 is moved downward. Thus, the supporting point 115 of the head arm 116 assumes a released state.

Consequently, the head arm 116 is moved downward by virtue of the head push spring 147. The upper head 162 touches the recording surface of the magnetic flexible disc 235 in the head window section 236. Accordingly, the lower head 160 securely contacts the magnetic flexible disc 235 by a pushing reaction of the upper head 162.

Under the above-state condition, the recording and reproducing of the magnetic recording and reproducing apparatus can be started by activating the disc-driving motor 40.

Next, the operation of removing magnetic disc cassette 230 is described.

The removal of the magnetic disc cassette 230 is accomplished by pushing the eject button 180. Namely, the push of the eject button 180 serves the lower slanted guide 56 of the eject lever 50 to lift up the guide roller 69.

In conformity with this lifting, the magnetic disc cassette 230 is lifted up by the lower surface plate 72 of the holder 70. Concurrently, the lock-releasing step 61 of the eject lever 50 is coming closer to the operation arm 97 of the stop lever 96. However, at this stage, the lock lever 90 remains in the rest state because of the engagement of the return stopper 93 of the lock lever 90 with the stopper 98 of the stop lever 96.

Accordingly, the shutter lever 82 is stopped at the location where the shutter 240 of the magnetic disc cassette 230 is released, because the lock lever stopper 87 provided at the projecting portion 86 in the shutter lever 82 is pressed upon the operation lever 91 of the lock lever 90.

Further, the eject lever 50 is pushed and soon, the guide roller 69 is pressed on to the roller seat 60 and thus the upward movement of the holder 70 and the magnetic disc cassette 230 is completed.

Moreover, when the eject lever 50 is operated, the lock-releasing step 61 of the eject lever 50 is pressed upon the operation arm 97 of the stop lever 96. The counter-clockwise rotation is applied to the stop lever 96 as opposing the force of the lock spring 175 by the push-in movement of the eject lever 50. The stopper section 98 of the stop lever 96 is disengaged from the return stopper 93 of the lock lever 90 by virtue of this rotation.

At this moment, the lock lever 90 is rotated in the counter-clockwise direction by virtue of the force of the lock spring 175 and the lock claw 92 of the lock lever 90 engages with the locking step 62 of the eject lever 50. Concurrently, the operation lever 91 of the lock lever 90 is disengaged from the lever stopper section 87 of the shutter lever 82.

Accordingly, the shutter lever 82 is rotated in the counter-clockwise direction by virtue of the force of the shutter spring 174 and, by this operation force, the magnetic disc cassette 230 is ejected and simultaneously the shutter 240 is closed.

Hereinabove, the normal operation case has described where the magnetic disc cassette 230 is correctly inserted.

Next, the protective operation will be described in case of erroneously inserting the magnetic disc cassette 230 with no opening the shutter 240 or reversely inserting it.

Figure 8:
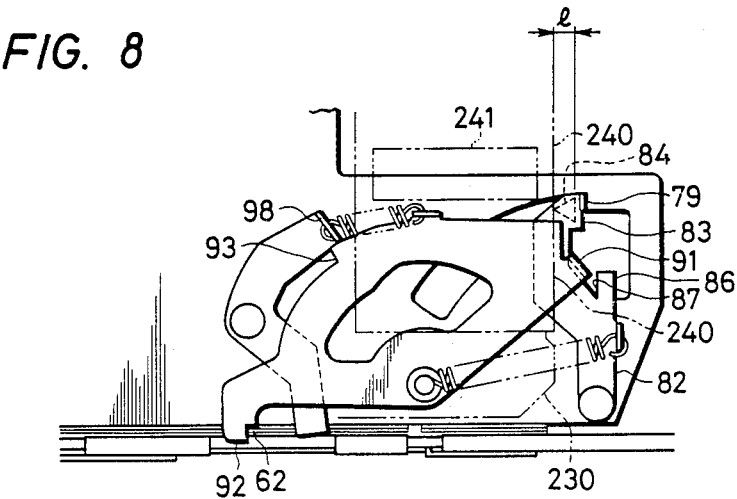
FIG. 8 is a detailed view showing the protective operation when a magnetic disc cassette is erroneously inserted.

FIG. 8 shows the above-stated erroneous operation state. Namely, in process of inserting the magnetic disc cassette 230, for example, it is considered that the shutter push section 83 of the shutter lever 82 is loaded on to the shutter 240 of the magnetic disc cassette 230.

As stated above, in case of continuing the insertion of the magnetic disc cassette 230 keeping with the closed condition of the shutter 240, the rear end of the guide stopper 84 of the shutter lever 82 is pressed upon the shutter 240. Continuing the insertion in this state, the shutter push section 83 of the shutter lever 82 is pressed upon the lever stopper 79 provided in the holder 70 and then is stopped. Under this state, the rear end of the magnetic disc cassette 230 is stopped further rearwardly than under normal operation by 1.

Thus, the stopper guide 239 which is the end of the magnetic disc cassette 230 is not pressed upon the operation lever 91 of the lock lever 90, and the turning effect of the lock lever 90 is not generated. Thus, the lock claw 92 of the lock lever 90 is left engaged with the locking step 62 of the eject lever 50 at rear portion and thus the magnetic disc cassette 230 and the holder 70 are not caused to fall down. Accordingly, there is no chance that the magnetic head 162 will collide with the shutter 240 of the magnetic disc cassette 230.

As stated above, the guide stopper 84 of the shutter lever 82 performs a function of detecting the opened or closing condition of the shutter 240 and of preventing the magnetic disc cassette 230 from being pushed into the final end in the close condition.

Further, at the starting time of falling down the magnetic disc cassette 230, the counter-clockwise turning effect of the lock lever 90 can be maintained at the stopper section 98 of the stop lever 96.

The counter-clockwise turning effect of the shutter lever 82 is stopped because of the returning force to the magnetic disc cassette 230 caused by the operation lever 91 of the lock lever 90 in process of falling down the magnetic disc cassette 230 and the fact that the lock lever stopper 87 provided at the projecting portion 86 of the shutter lever 82 is pressed upon the operation lever 91 of the lock lever 90.

Accordingly, the returning force to the magnetic disc cassette 230 is not performed and thus the magnetic disc cassette 230 can fall down at the stable state so as to obtain a inserting operation.

The above-stated embodiment of the present invention has the following effects.

(1) Under the close state in which the shutter of the magnetic disc cassette lies, (which means the case of the erroneous operation of the shutter lever in the normal insertion of the case that the shutter can not be opened by inserting the magnetic disc cassette backwards), the holder does not fall down and thus there is no possibility of damaging the magnetic head by a collision with the shutter of the magnetic disc cassette.

(2) Since the process of a fall down of the magnetic disc cassette, the shutter lever engages with the operation lever of the lock lever, the returning force to the magnetic disc cassette is not generated and the magnetic disc cassette is properly loaded on the magnetic disc cassette seat and the hub receiver securely engages with the hub of the magnetic flexible disc. Consequently, the inserting errors of the magnetic disc cassette are virtually eliminated.

(3) Since the stop lever is stopped by the lock lever, the lock claw of the lock lever do not touch the side plate of the eject lever. Thus, the force to the holder is limited only to a force caused by the guide roller and thus the frictional force in the right and the left directions is not generated. As a result, it is possible to stably obtain the falling down and the floating up of the holder.

(4) Since, in the floating up action of the magnetic disc cassette, the releasing of the stop lever against the lock lever is designed to be accomplished after the guide roller is run on to the roller seat of the eject lever, the magnetic disc cassette is not damaged, nor is the magnetic disc cassette snagged by the ejection of the magnetic disc cassette during the floating up of the magnetic disc cassette. Further, before releasing the stop lever, the magnetic disc cassette is entered into the reloading action and thus there is nothing the user need worry about.

(5) Respective levers are made to be plates and are made in a stacked structure formed. Thus, the cassette controlling section of the magnetic recording and reproducing apparatus can be made smaller.

(6) Since both the shutter open and close means and the holder falling down and floating up control means are located at one place on the upper surface of the holder, dimensional errors are eliminated and the confirmation of the action can be easily accomplished, and excellent productivity in the magnetic recording and reproducing apparatus can be realized.

We claim:

1. A magnetic recording and reproducing apparatus comprising:

a chassis;

a carriage having a magnetic head mounted on said chassis;

an eject lever with grooves therein mounted on said chassis;

a holder having a cassette inserting portion and guide rollers cooperating with the grooves so that the holder is mounted slidingly on said eject lever;

a magnetic disc cassette with a built-in shutter received in the cassette inserting portion of said holder so as to be located next to the magnetic head to perform a recording and reproducing operation upon effecting lowering of the holder by cooperation between the guide rollers moving on the grooves;

means associated with said holder for opening and closing the shutter of said magnetic disc cassette, said shutter opening and closing means including a shutter lever and a shutter spring for biasing the shutter lever; and inserting and ejecting of said magnetic disc cassette effects a respective lowering and raising of said holder, and ejection of said cassette is effected by pushing of an eject button operatively associated with said eject lever, wherein said eject lever includes a locking step, said shutter opening and closing means is installed on an upper surface of said holder, and means for controlling a lowering and raising of said holder is on the upper surface of said holder and operatively associated with the shutter lever, said controlling means includes a locking member and a lock lever, whereby in an inserting operation of said magnetic disc cassette, said holder is positioned at an upper portion of said eject lever, the shutter lever of said shutter opening and closing means rotates in opposition to a biasing force of the shutter spring so as to open the shutter of said magnetic disc cassette in accordance with an inserting force of said magnetic disc cassette as it is inserted into said holder inserting portion, the locking member of said controlling means disengages from the locking step of said eject lever and said locking member and said lock lever are operatively associated with said holder, the lock lever of said controlling means is engaged with the shutter lever of said shutter opening and closing means, and in an ejecting operation of said magnetic disc cassette, the lock lever of said controlling means is disengaged from the shutter lever of said shutter opening and closing means, and the locking member of the controlling means is engaged with the locking step of said eject lever.

2. A magnetic recording and reproducing apparatus according to claim 1, wherein said lock lever is operatively arranged to be rotated by a push of said magnetic disc cassette, and the lock lever of said controlling means serves to release the locking step of said eject lever by rotation of the lock lever of said controlling means.

3. A magnetic recording and reproducing apparatus according to claim 2, wherein said controlling means further includes a stop lever, and the stop lever of said controlling means is engaged with the lock lever of said controlling means when a stopping step of said eject lever is released and then the stop lever of said controlling means stops a returning force of the lock lever of said controlling means.

4. A magnetic recording and reproducing apparatus according to claim 3, wherein the engagement of the stop lever of said controlling means with the lock lever of said controlling means is released by an operation of said eject lever.

5. A magnetic recording and reproducing apparatus according to claim 1, wherein said shutter opening and closing means further includes a guide stopper on the shutter lever for detecting erroneous insertion of the cassette, and said holder includes a stopper for the shutter lever of said opening and closing means.

6. A magnetic recording and reproducing apparatus comprising:
   a chassis formed of a box-like shape;
   a carriage having a magnetic head slidably mounted on said chassis;
   an eject lever comprised of slide plates with grooves therein movably mounted on both side walls of said chassis;
   a holder having a cassette inserting portion and guide rollers cooperating with the grooves so that the holder is mounted slidingly on the inside of said side plates of said eject lever;
   a magnetic disc cassette with a built-in shutter received in the inside of the cassette inserting portion of said holder so as to be located next to the magnetic head to perform recording and reproducing operations upon effecting lowering of the holder by cooperation between the guide rollers moving on the grooves;
   and an eject button mounted on said eject lever for ejecting of said magnetic disc cassette;
   a means associated with said holder for opening and closing the shutter of said magnetic disc cassette, said shutter opening and closing means including a shutter lever and a shutter spring for biasing the shutter lever; and
   inserting and ejecting of said magnetic disc cassette effects a respective lowering and raising of said holder, and ejection of said cassette is effected by pushing of the eject button, wherein:
   said eject lever includes side plates nearly contacting the side walls of said chassis, a lock releasing member provided on each of the side plates of said eject lever, and a locking step mounted on the side plates of said eject lever,
   said shutter opening and closing means are operatively associated on an upper surface of said holder, and
   means for controlling the lowering and raising of said holder is on the upper surface of said holder on operatively associated with the shutter lever, said controlling means includes a locking member and lever;
   whereby in an inserting operation of said magnetic disc cassette, said holder is positioned at an upper portion of said eject lever, the shutter lever of said shutter opening and closing means rotates in an opposite direction to a force of the shutter spring so as to open the shutter of said magnetic disc cassette in accordance with an inserting force of said magnetic disc cassette as it is inserted into said holder inserting portion, the locking member of said controlling means disengages from the locking step of said eject lever, the lock lever of said controlling means is engaged with said shutter opening and closing means, and in an ejecting operation of said magnetic disc cassette, the lock lever of said controlling means is disengaged from the shutter lever of said shutter opening and closing means, the locking member of said controlling means is engaged with the locking step of said eject lever.

7. A magnetic recording and reproducing appartus according to claim 6, wherein said controlling means further includes a lock spring.

8. A magnetic recording and reproducing apparatus according to claim 7, wherein the shutter lever of said shutter opening and closing means is rotatively installed on the upper portion of said holder, and further the shutter lever of said shutter opening and closing means includes a shutter push member for opening and closing the shutter of said magnetic disc cassette, a guide stopper for detecting an erroneous operation, and a lock lever stopper for stopping the lock lever of said controlling means, and the shutter push member and the guide stopper of said shutter opening and closing means are projected respectively downward from an opening of said holder.

9. A magnetic recording and reproducing apparatus according to claim 7, wherein the lock lever of said controlling means is rotatably installed for slidably moving the shutter lever of said shutter opening and closing means between an upper portion of said holder and the lock lever of said controlling means, the lock lever of said controlling means projects into an opening of said holder, and the lock lever includes a lock claw engaging the locking step of said eject lever, a stop lever having a stopper, and a return stopper engaged with the stopper.

10. A magnetic recording and reproducing apparatus according to claim 9, wherein the stop lever of said controlling means is rotatably installed so as to be movable between the upper portion of said holder and the lock lever of said controlling means, the stop lever of said controlling means further includes an operation arm pressing on the lock releasing member of said eject lever.

11. A magnetic recording and reproducing apparatus according to claim 6, wherein, in the condition before loading said magnetic disc cassette, said eject lever is located where said eject lever is pushed, said holder is stopped at an upper position, and the magnetic head of said carriage is maintained at a location of an upper portion of said holder, wherein the shutter lever of said shutter opening and closing means is positioned at a front side of an opening of said holder, a lock lever of said controlling means is forced in the counter-clockwise direction and engages the locking step of said eject lever, and a stop lever of said controlling means runs on to an upper portion of the lock lever of said controlling means.

12. A magnetic recording and reproducing apparatus according to claim 6, wherein in the condition of loading said magnetic disc cassette, the shutter lever of said shutter opening and closing means releases the shutter of said magnetic disc cassette, the lock lever of said controlling means rotates in the clockwise direction, and a return stopper of the lock lever of said controlling means coincides with a stopper portion of a stop lever of said controlling means, the lock lever of said controlling means is disengaged from a locking step of said eject lever, the shutter lever of said shutter opening and closing means is operative to release the shutter of said magnetic disc cassette, said eject lever is moved in a forward direction by an eject spring mounted on said chassis so as to project forward of said eject button, and the magnetic head of said carriage contacts the recording surface of the magnetic disc of said magnetic disc cassette.

13. A magnetic recording and reproducing apparatus according to claim 6, wherein, in the condition of ejecting said magnetic disc cartridge, said eject button is pushed to operate said eject lever, and said magnetic disc cassette is lifted up by said holder, a lock releasing member of said eject lever engages a stop lever of said controlling means, the stop lever of said controlling means is rotated and is disengaged from a lock lever of said controlling means, the lock lever of said controlling means is rotated in a counter-clockwise direction, and a lock claw of the lock lever of said controlling means engages with the locking step of said eject lever, the lock lever of said controlling means is disengaged from the shutter lever of said shutter opening and closing means, the shutter lever of said shutter opening and closing means is rotated by force of the shutter spring in the counter-clockwise direction, and said magnetic disc cassette is ejected and simultaneously the shutter of said magnetic disc cassette is closed.

14. A magnetic recording and reproducing apparatus according to claim 6, in the condition of a protective operation in case of erroneously inserting said magnetic disc cassette, wherein the shutter lever of said shutter opening and closing means is pressed on the shutter of said magnetic disc cassette, a shutter push member of said shutter opening and closing means is pressed on a lever stopper portion provided in said holder and is stopped, a lock claw of a lock lever of said controlling means is left to be engaged with a lock releasing member of said eject lever, said magnetic disc cassette and said holder are not caused to be lowered and the magnetic head of said carriage does not collide with the shutter of said magnetic disc cassette.

15. A magnetic recording and reproducing apparatus according to claim 1, wherein, in the inserting operation of said magnetic disc cassette, after said magnetic disc cassette presses said controlling means, said controlling means is rotated, the lock lever of said controlling means is engaged with the shutter lever of said shutter opening and closing means, the locking member of said controlling means is disengaged from the locking step of said eject lever, and the shutter of said magnetic disc cassette is released, whereby said holder is moved downwardly and said magnetic disc cassette is seated on said chassis.

16. A magnetic recording and reproducing apparatus according to claim 1, wherein, in an ejection operation of said magnetic disc cassette, the lock lever of said controlling means is disengaged from the shutter lever of said shutter opening and closing means, the shutter lever of said shutter opening and closing means is rotated by a force of the shutter spring, whereby said magnetic disc cassette is ejected and the shutter of said magnetic disc cassette is closed.

* * * * *